(12) United States Patent
Hyland et al.

(10) Patent No.: US 10,728,235 B2
(45) Date of Patent: *Jul. 28, 2020

(54) SYSTEM AND METHOD FOR MOBILE SINGLE SIGN-ON INTEGRATION

(71) Applicant: Globoforce Limited, Southboro, MA (US)

(72) Inventors: Jonathan Hyland, Dublin (IE); Eddie Fitzpatrick, Dublin (IE)

(73) Assignee: Globoforce Limited, Southboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,054

(22) Filed: Jan. 24, 2019

(65) Prior Publication Data

US 2019/0190905 A1 Jun. 20, 2019

Related U.S. Application Data

(63) Continuation of application No. 14/644,707, filed on Mar. 11, 2015, now Pat. No. 10,230,715, which is a continuation of application No. 13/861,878, filed on Apr. 12, 2013, now Pat. No. 9,009,806.

(51) Int. Cl.
*H04L 29/06* (2006.01)
*G06F 21/41* (2013.01)

(52) U.S. Cl.
CPC ......... *H04L 63/0815* (2013.01); *G06F 21/41* (2013.01); *H04L 63/0861* (2013.01); *H04L 63/18* (2013.01)

(58) Field of Classification Search
CPC . G06F 21/41; H04L 63/0815; H04L 63/0861; H04L 63/18; H04L 63/0807; H04L 67/306; H04W 12/06
See application file for complete search history.

(56) References Cited

U.S. PATENT DOCUMENTS

| 2008/0072301 | A1* | 3/2008 | Chia | G06F 21/41 726/8 |
| 2013/0007845 | A1* | 1/2013 | Chang | G06F 21/62 726/4 |

* cited by examiner

*Primary Examiner* — Abiy Getachew
(74) *Attorney, Agent, or Firm* — Goodwin Procter LLP

(57) ABSTRACT

Improved methods and systems for integrating client-side single sign-on (SSO) authentication security infrastructure with a mobile authorization protocol are disclosed that provide clients with secured SSO mobile access to third-party services. Embodiments of the present invention leverage SSO authentication protocols that are utilized at many client-side systems already and integrate these SSO authentication protocols with a mobile SSO authorization protocol, thereby effectively extending the SSO framework to mobile service requests of web services at third-party service provider systems. Embodiments of the present invention provide a secure and automated solution which may be implemented in any existing client-side SSO frameworks with minimum cost and time, while providing a lightweight and secure solution that provides users using either native applications or mobile web application to access third-party web services.

23 Claims, 12 Drawing Sheets

| Parameter | Description |
|---|---|
| Access Token | OAuth Access Token |
| pagenum | Page of results to retrieve |
| pagesize | Max number of approvals to retrieve |

Figure 10A

| Parameter | Description |
|---|---|
| Access Token | OAuth Access Token |
| client | Company A's Client ID |
| action | 'approve' or 'disapprove' |
| groupids | One or more groupid's |
| Message | Disapproval message in the case of disapproval |

Figure 10B

SYSTEM AND METHOD FOR MOBILE SINGLE SIGN-ON INTEGRATION

FIELD OF THE INVENTION

The invention is generally directed to a method and system for mobile single sign-on (SSO) integration and more particularly, to an improved method and system for integrating client-side SSO authentication infrastructure with mobile authorization measures to provide mobile devices with secured SSO access to third-party web services.

BACKGROUND OF THE INVENTION

Recent developments in software and technology solutions have allowed web uses to access websites and web-based services faster and easier than ever before. At the same time, these solutions provide network system engineers with enhanced secured protocols that protect their clients vital information.

Access-control protocols, such as Single Sign-on (SSO) access control, offer users a secure and simple method of accessing any number of services using a single identifier. For example, many companies allow employees to sign-on to the company's intranet and network using a single access identifier. Once the users identity has been authenticated, such as by entering a single unique username and password, the employee can access any number of services provided by the company server. The user, for example, can review his or her employment information, read and send emails, and request tax-related documentation, all without having to sign in again or provide additional credentials. The user's credentials are automatically retrieved and validated by the service provider, thereby eliminating the need for the user to sign in with each request.

Employees are often provided access to not only internal web services, but also services provided by third-party systems that are external to his or her corporate computer system. For example, employees may be provided with access to third-party libraries, such as those containing literature and publications, and to third-party tools, such as programs that allow employees to recognize other employees for important achievements, as well as various other useful services. In these cases, the third-party service provider computer system may provide web services to any number of company computer systems (e.g., the enterprise systems for a plurality of different companies), each of which may be referred to as a client system.

Thus, an SSO framework can provide many benefits that are desirable from the perspective of users and network engineers alike, including providing a consistent identity across all services and platforms, reducing username/password confusion, reducing user time spent on returning passwords, and reducing the number of authentication requests.

However, currently available SSO solutions have been developed to provide web-based services for desktop and terminal-based users first and foremost, with much less attention being paid to the servicing of service requests from smartphones, tablets and other mobile devices. While many developers have modified existing SSO systems to give mobile devices access to web services, these attempts at integration have been largely inadequate. The flaws of current implementations are especially evident when the client system supports third-party web services.

With current solutions, mobile device users of many corporate computer systems must manually access the third-party service provider's system to gain access to its web services. For example, a user wishing to view a series of educational programs provided by a service provider using a mobile device will have to first sign into his or her company's computer system using previously provided SSO credentials and request the generation of a username and password specifically for use with the third-party service provider system. At the Service provider system, an account is created and the account information, including the newly generated username and password, is stored. The user must then manually log into the website of the service provider system to access the services. The user must do this each time he or she wishes to access the third-party web-service. With this implementation, many of the advantages gained in implementing an SSO framework are largely negated.

Furthermore, there are security concerns with current implementations for handling mobile third-party service requests. User SSO accounts are distinct and separate from the accounts stored at each service provider system. The service provider system, therefore, must synchronize account information with each customer system (e.g., each corporate computer system), often on a weekly or monthly basis. Accordingly, between synchronizations, there may be extensive data disparity between the two account databases. For example, many users' rights to the system and its services could have been modified or revoked outright. As a result, while they have no rights to access their own company's system, these revoked users may continue to have access to the services provided by these third-party service provider systems. An unauthorized user may intentionally damage network infrastructure, steal corporate and other sensitive information, and perform various malicious acts on the system.

Therefore, an improved solution for providing mobile SSO authorization and authentication access to third-party web services is needed. The solution should support any number of frameworks for authentication, including supporting any number of encryption mechanisms during authentication. In addition, the solution should require minimal client customization. That is, the solution should provide clients with an integrated solution while minimizing client-required installations or modifications to their existing SSO-based computer systems.

Furthermore, the solution should operate to provide users with SSO authenticated and authorized access to services using a native application running on the a user's mobile device as well as a web application running in the mobile device's web browser, thereby providing additional flexibility and function for users of the system. This would also expand the mobile devices that would be supported. Further still, the solution should be a lightweight solution to minimize the amount of data transferred to and from the mobile devices, which may be operating with limited bandwidth.

Finally, the solution should overcome the deficiencies of currently available solutions and meet the needs of both clients and service providers.

SUMMARY OF THE INVENTION

Accordingly, improved methods and systems for integrating client-side single sign-on (SSO) authentication security infrastructure with a mobile authorization protocol are disclosed that provide clients with secured SSO mobile access to third-party services.

An aspect of the present invention is a method for providing access to mobile web services provided by a third party service provider system using single sign-on credentials that are managed by a client-side computer system. The method begins with the receiving of a request to access third party web services using a mobile device and redirecting the mobile device to the web-identification authentication service at the client-side computer system to authenticate the identity of the user, such as by using his or her SSO credentials. As a result of the redirecting, an authentication token is generated by the client-side computer system and is received at the service provider system for processing. The authentication token that is received is then validated and an authorization access token is generated in response. In one embodiment, an authorization access code is generated in response to the validation of the authentication code. This authentication code may then be exchanged for an authorization token.

The mobile device may then submit service requests, with the generated authorization access token attached, to the service provider system. The access token is processed to validate the authority of the user to receive the service request. Upon the processing of the authorization access token, the service request is processed and the results are delivered accordingly.

In another aspect of the present invention, a service provider computer system for providing web services to mobile devices using single sign-on (SSO) credentials managed by a client-side computer system is disclosed to contain a web authentication engine, a token engine, and a web services engine. The web authentication engine is configured to receive an authentication token generated by the client-side computer system upon authenticating an identity of a user at the mobile device using the user's single sign on credential and to process the authentication token to validate the authentication token. Furthermore, the token engine is configured to generate an authorization access token and provide the authorization access token to the mobile device. Finally, the web services engine is configured to process a service request received from the mobile device, the service request containing the authorization access token. The web services engine processes the authorization access token in order to validate authority of the user to receive the service request and services the service request in response.

BRIEF DESCRIPTION OF DRAWINGS

The present invention will now be described, by way of example only, with reference to the accompanying Figures, in which:

FIGS. 10A-10B depict exemplary parameters of service requests containing access tokens in accordance with embodiments of the present invention.

The following describes in detail various embodiments of the present invention. One of ordinary skill in the art would understand that standard programming and engineering techniques may be used to produce such embodiments including software, firmware, hardware, or any combination thereof to implement the disclosed subject matter. The attached figures depict exemplary embodiments and are meant to be understood in view of the details disclosed herein.

DETAILED DESCRIPTION OF THE INVENTION

Figure 1A:
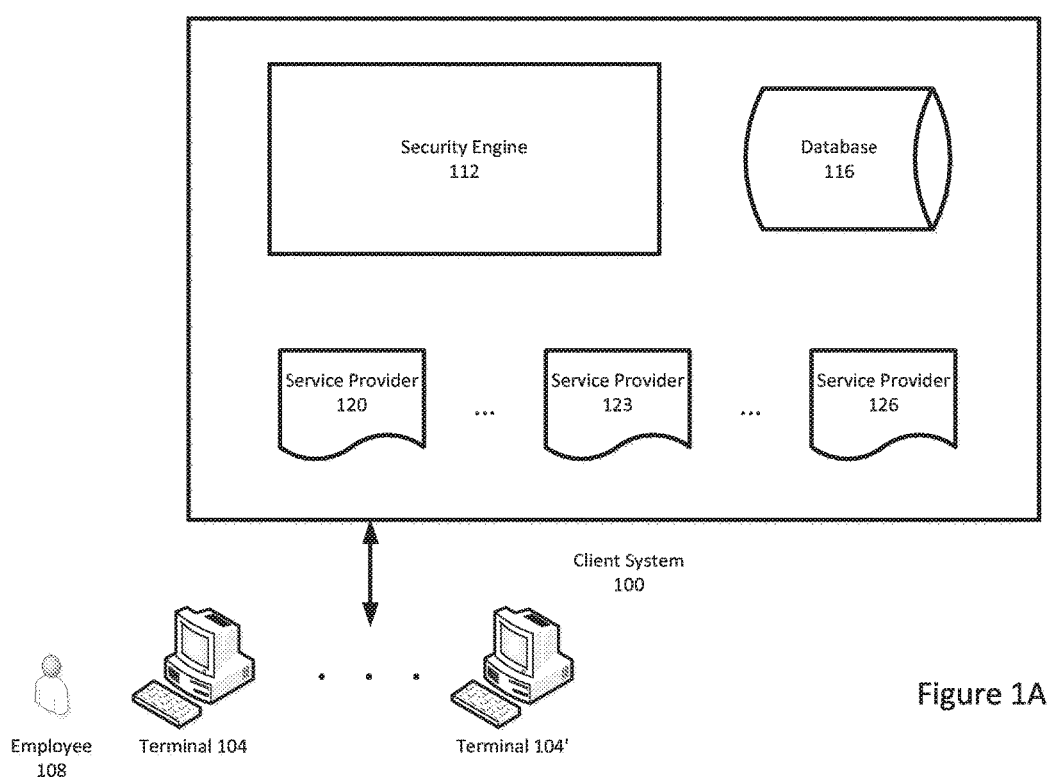
FIGS. 1A-1B depict a typical working environment of a client system operating under an SSO framework.

To understand the embodiments and features of the present invention, the typical client-side SSO infrastructure as known in the prior art will first be described. FIG. 1A depicts a typical working environment of a client system 100 comprising a security engine 112, database 116, and a plurality of service providers 120-126. The client system 100 may be a computer system of a company that supports an SSO framework. For example, client system 100 may be a corporation with a hundred employees, where each employee is given an SSO username and a corresponding password that the employee may use to access a number of services provided by service providers 120-126 within the client system 100. Each employee may access these services using one or more terminals, such as terminal 104 and 104', that are connected to client system 100.

Under an SSO framework, an employee 108 may access the terminal 104 and sign in usurp his or her assigned SSO credentials, and upon signing in, the user may then have access to services available to that particular employee, without having to re-sign into the system for each particular requested service. The employee 108's credentials are authenticated by the security engine 112 at the client system 100. The security engine 112 may check the credentials entered by the employee 108 against an identity database 116 to ensure that the employee 108's entered identity matches up with the identity information contained in the database 116, thereby validating the employee 108's purported identity.

Once the security engine 112 has validated the employee 108's identity, the security engine 112 may provide the employee 108 with access to the services available to employee 108, such as services related to the company's intranet (service provider 120), electronic file system (service provider 123), and email system (service provider 126), amongst other services. Thus, the employee 108 may access the intranet to view the latest project news and upload files to his or her team's shared drive, all without having to reenter his or her credentials. This SSO privilege extends until the user either signs out or the access rights expire.

With each service request, the service provider may be provided with proof of the user's identity. Under one SSO architecture utilizing Security Assertion Markup Language (SAML) version 1.1, for example, the service provider (e.g., intranet service provider 120) may receive a SAML assertion with each initial service request. The SAML assertion, for instance, may indicate to the service provider 120 that the employee 108 has authenticated with the security engine 112 at particular time using a particular method of authentication. On the basis of this assertion, the service provider 120 can make an access control decision to determine whether to perform the requested service for the employee 108. The security engine 112 determines whether the user is authorized to receive the requested service by referencing an access control database that contains rules describing the access rights and privilege of the employee 108.

The manners in which authentication and authorization is carried out may differ from one SSO architecture to another SSO architecture. Client system 100 may utilize any security engine that supports any authentication mechanism using any encryption and hashing technologies. Client system 100, for example, may support one of many symmetric encryption algorithms, e.g., SAML version 2.0, while another client system may utilize Triple Data Encryption Algorithm (TDEA or triple DES) encryption technology in providing authentication services. Accordingly, a triple DES assertion would be made at a second system, rather than a SAML assertion.

Figure 1B:
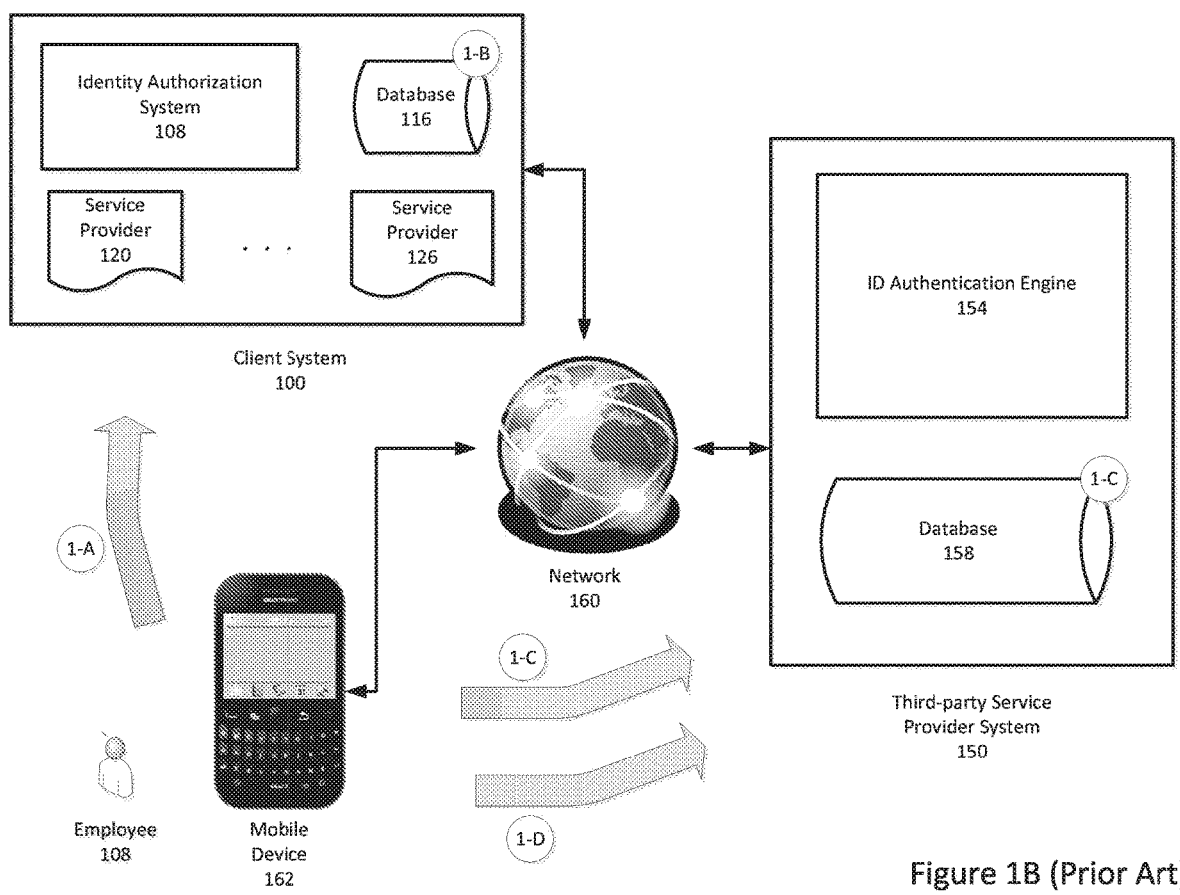

SSO users may also have access to third-party services. FIG. 1B depicts an exemplary working environment of client system 100 as known in the prior art, wherein, in addition to the service providers 120-126 at client system 100, users of client system 100 further have access to services provided by third-party service providers, such as the services available at third-party service provider system 150. Third-party service provider system 150 may contain an identification authentication engine 154 and a database 158. The employee 108, for instance, may access the third-party service provider system 150 using a mobile device 162 connected to network 160, which may be a part of or include the Internet.

While SSO provides many benefits, from providing consistent identity across all services and platforms for its users to reducing the number of authentication requests that are received, current SSO implementations involving the servicing of requests for access to third-party services are inefficient, insecure and flawed. As described briefly above, while existing SSO solutions can provide users of system 100 with sign of access to various services provided by internal service providers (e.g., service providers 120-126), current implementations of SSO do not extend SSO authentication and authorization services to third-party service providers when the user requests the service using a mobile device. Instead, as shown in FIG. 1B, to provide a user using mobile device 162 with a service at third-party service provider system 150, the user must manually access the service at the service provider system 150. For example, employee 108 using mobile device 162 must first create an account and register the username and password with the third-party service provider system 150. The employee 108 may do this by logging into the system 100 using his or her SSO credentials, as depicted in FIG. 1B as step 1-A and submit a service request to the security engine 112 to generate a username and password and to cause the account to be created at the service provider system 150 (step 1-B). The employee 108 may then have to manually register the username and password at the website of the service provider system 150 (step 1-C), thereby creating the account information within database 158 containing the username and password associated with the service provider system 150 well as identification that identifies the employee 108 SSO username). Finally, to request a service, the user must manually enter the username and password within the web page of the third-party service provider system 150 or within an application provided by third-party service provider system 150 (step 1-D). Thus, the current solutions are inefficient and cumbersome and they nullify many benefits gained from an SSO implementation. The user must manage multiple accounts, including multiple credentials. Moreover, as described above, the current solutions are insecure as they allow unauthorized access to the system between synchronizations between the database 116 and database 158.

Embodiments of the present invention overcome deficiencies of current implementations of SSO by leveraging the SSO authentication protocols that are already utilized at most client-side systems, such as SAML, and integrating these SSO authentication protocols with a mobile SSO authorization protocol, thereby effectively extending the SSO framework to mobile service requests of web services at third-party service provider systems. Embodiments of the present invention provide to secure and automated solution which may be implemented in any existing client-side SSO frameworks with minimum cost and time, while providing a lightweight and secure solution that provides users using either native applications or mobile web application to access third-party web services.

Figure 2:
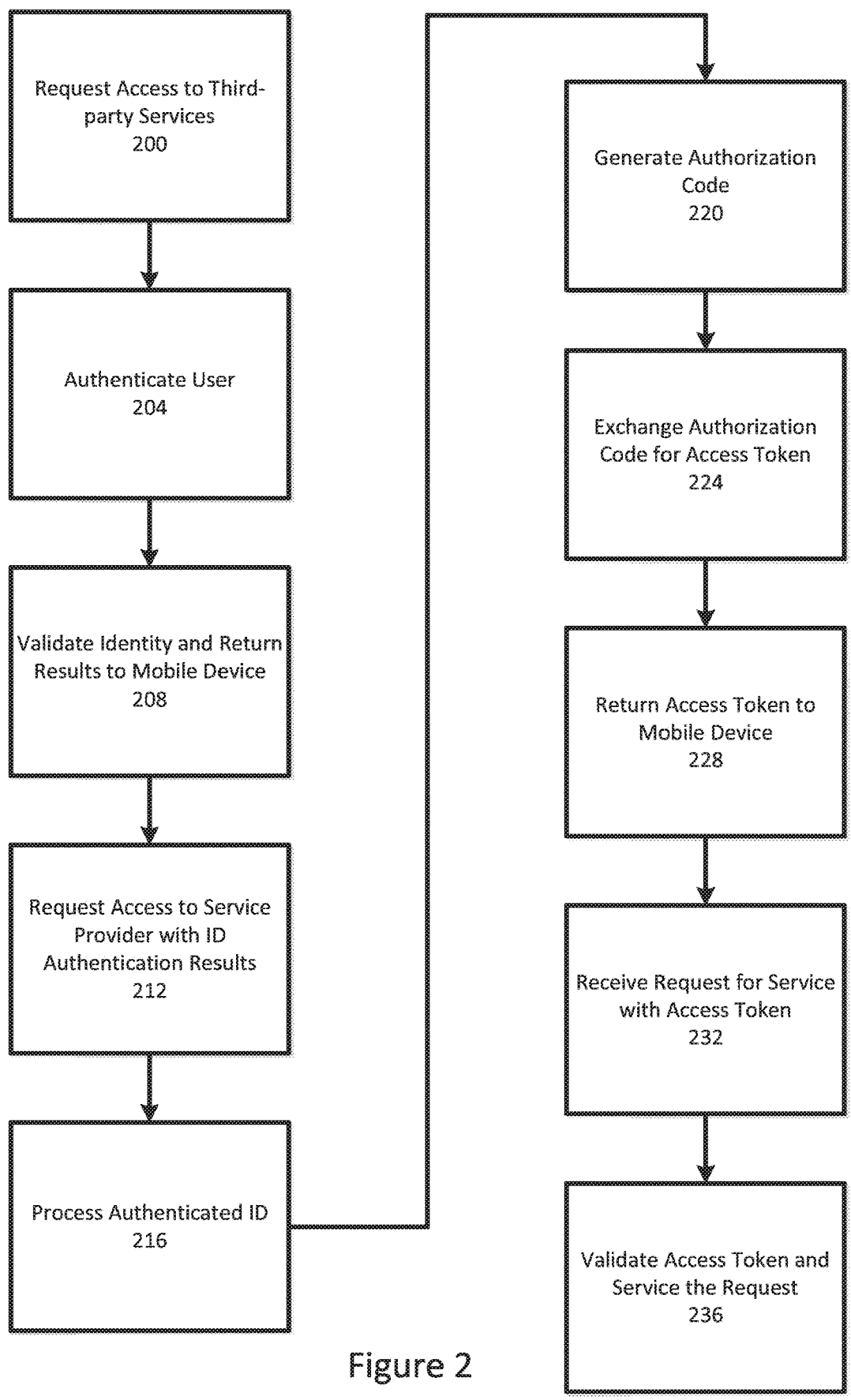
FIG. 2 depicts a flowchart illustrating a method for handling mobile third-party service requests under an SSO authentication and authorization framework in accordance with an embodiment of the present invention.
Figure 3:
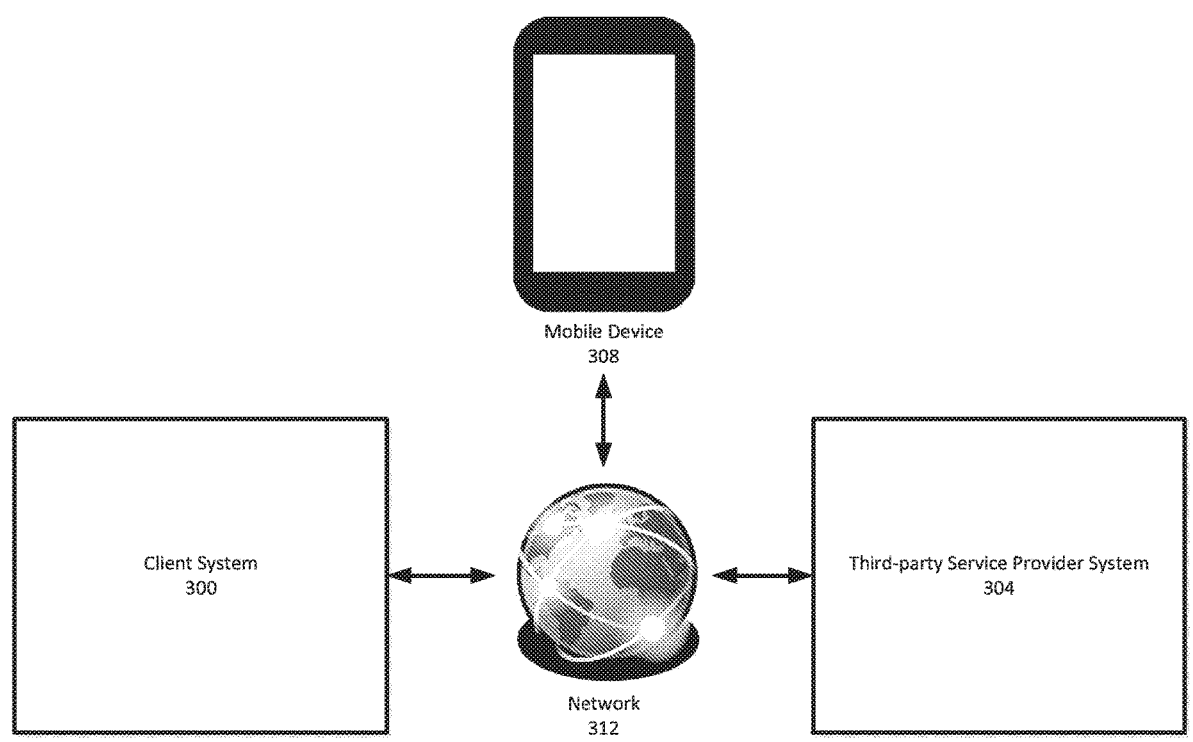
FIG. 3 depicts a mobile SSO integrated system in accordance with an embodiment of the present invention.

FIG. 2 depicts a flowchart illustrating a method for handling mobile third-party service requests under an SSO authentication and authorization framework in accordance with an embodiment of the present invention. The steps of FIG. 2 are described with reference to FIG. 3, which depicts a mobile SSO integrated system in accordance with an embodiment of the present invention, comprising a client system 300, third-party service provider system 304 and mobile device 308 that are connected to one another via network 312.

The embodiments of the present invention integrate the authentication protocol utilized by SSO framework at the client system 300 with an authorization protocol supported by the third-party service provider system 304. Together, these protocols are configured to provide users of any number of client systems with seamless authenticated and authorized mobile access to the web services at the third-party service provider system 304. Automatically, the user is authenticated and authorized to access the service and the service is provided to the user at mobile device 308.

Referring to FIG. 2, at 200, a user using mobile device 308 requests access to a service available at the third-party service provider system 304. The user may submit the request through a native application, the web-browser or other methods, as discussed further below. In preferred embodiments, all communications between devices and systems disclosed herein are secure using one or more secured communication protocols. In the preferred embodiment, all communications are over Hypertext Transfer Protocol Secure (HTTPS) protocol. At 204, the request is received by the client system 300, which authenticates the user. The native application in the mobile device 308 may automatically know the address of the client system 300 associated with the user. In one embodiment, the user's request at 200 contains his or her identity information and also his or her proof of identity. For example, the user at 200 submits his or her username and password in placing the request. Various other types of security measures may be utilized to authenticate user's identity, including any that may be utilized by client systems.

At 208, upon the successful validation of the user's identity, a response is returned to the mobile device 308 that indicates the results of the validation. Where the validation is successful, the response may include proof that the user has been authenticated by the client system 300. In one embodiment, the response contains an authentication token that is in a form that conforms to the client system's SSO authentication protocol. For example, in one embodiment, the response at 208 contains a SAML assertion, though other types of security mechanisms known in the art may be used, including mechanisms utilized by any web based SSO protocols.

At 212, the mobile device 308 automatically relays the response to the third-party service provider system 304, attaching the proof of authentication returned by the client system 300. At 216, after processing the proof of authentication, third-party service provider system 304 determines that the user is an authenticated user and proceeds to determine that the user entered a mobile service request. Based on this determination, at 220, the third-party service provider system 304 automatically generates an authorization code that is returned to the mobile device 308.

The mobile device 308 at 224 may then utilize the returned authorization code to request an access token that may be used as a proof of authorization in when making service requests. Thus, at 224, the mobile device may automatically request the exchange of the authorization code for an access token. The access token is returned in 228 to the mobile device 308.

At 232, having received the access token, the mobile device 308 may submit service requests for processing. The request transmitted to the third-party service provider system 304 will contain the access token. With each service request, the user's access token will be validated to ensure that the user is authorized to receive the requested service. At 236, the user's service request is processed and the results are returned to the mobile device 308.

In one preferred embodiment, in addition to gaining access to third-party service provider system 304's services through the retrieval and use of an authentication token, the user may also access the services by directly accessing the third-party service system 304 with a previous provided username and password. Upon authentication, the client's mobile device 308 may be provided with an access token. As with the method described herein, subsequent service requests from the user's mobile device 308 may automatically include the access token, which will be validated at the third-party service system 304 prior to the processing of the service request itself.

Figure 4:
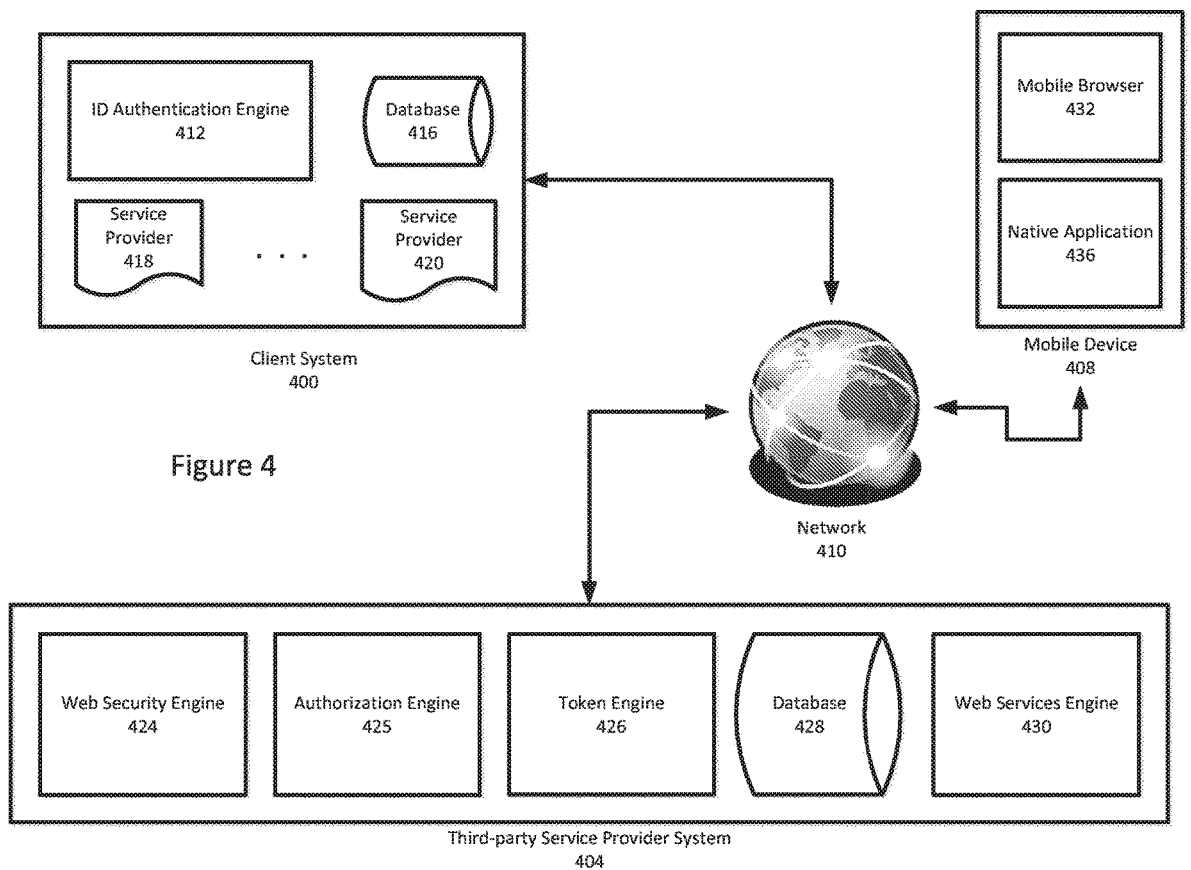
FIG. 4 depicts a detailed integrated mobile SSO system in accordance with an embodiment of the present invention.

FIG. 4 depicts a detailed integrated mobile SSO system in accordance with an embodiment of the present invention comprising a client system 400, third-party service provider system 404 and mobile device 408 that are connected to one another via network 410. As seen in FIG. 4, the client system 400 comprises an ID authentication engine 412 and identification database 416, along number of internal service providers 418-420. In addition, third-party service provider system 404 comprises a web security engine 424, authorization engine 425, token engine 426, database 428 and web services engine 430. Embodiments of the present invention allow a user using the mobile device 408 to access any number of web services provided by not only the client system 400 but also third-party service provider system 404. The mobile device 408 may include a mobile browser 432 and/or a native application 436 associated with the third-party service provider system 404 for providing users with access to the services made available by the third-party provider.

The operations of the components, systems and devices of FIG. 4 are described with reference to FIGS. 5A and 5B, which depict a method of processing a user service request in accordance with an embodiment of the present invention.

Referring to FIG. 4, a user, using mobile device 408, would like to receive web services that are available through third-party service provider system 404. For example, the third-party service provider system 404 provides users with tools for recognizing employees for achievements. In one embodiment, the third-party service provider system 404 is the system described in U.S. application Ser. No. 13/708,707, entitled "Systems and Methods for Analyzing Recognition Data for Talent and Culture Discovery," filed Dec. 7, 2012, which is incorporated herein in its entirety and hereinafter referred to as the "Employee Recognition System." User, using mobile device 408, for instance, may access the Employee Recognition System provided by the third-party service provider system 404 to recognize other employees within the organization associated with client system 400 for positive actions such as completing an important project or for being a team player, for example. In addition to recognizing other employees, a user may access services of the third-party service provider system 404 that generate and provide data graphs that describe the recognition instances within the organization. Other related services may also be accessible from the third-party service provider system 404, including the ability to edit profile information, send messages, generate reports and others.

Figures 5A, 5B:
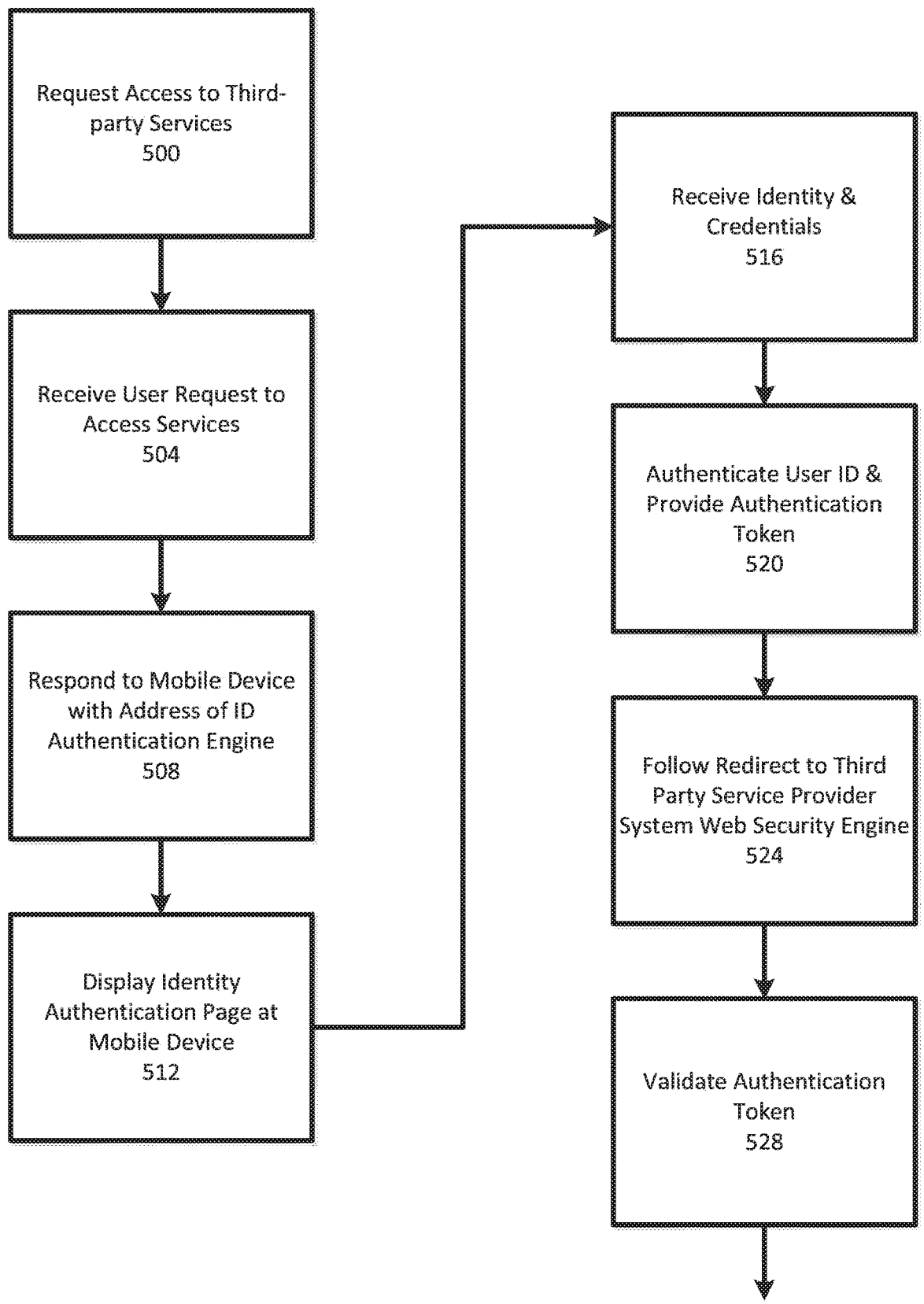
FIGS. 5A-5B depict another flowchart illustrating a method for handling mobile third-party service requests under an SSO authentication and authorization framework in accordance with an embodiment of the present invention.
Figure 5B:
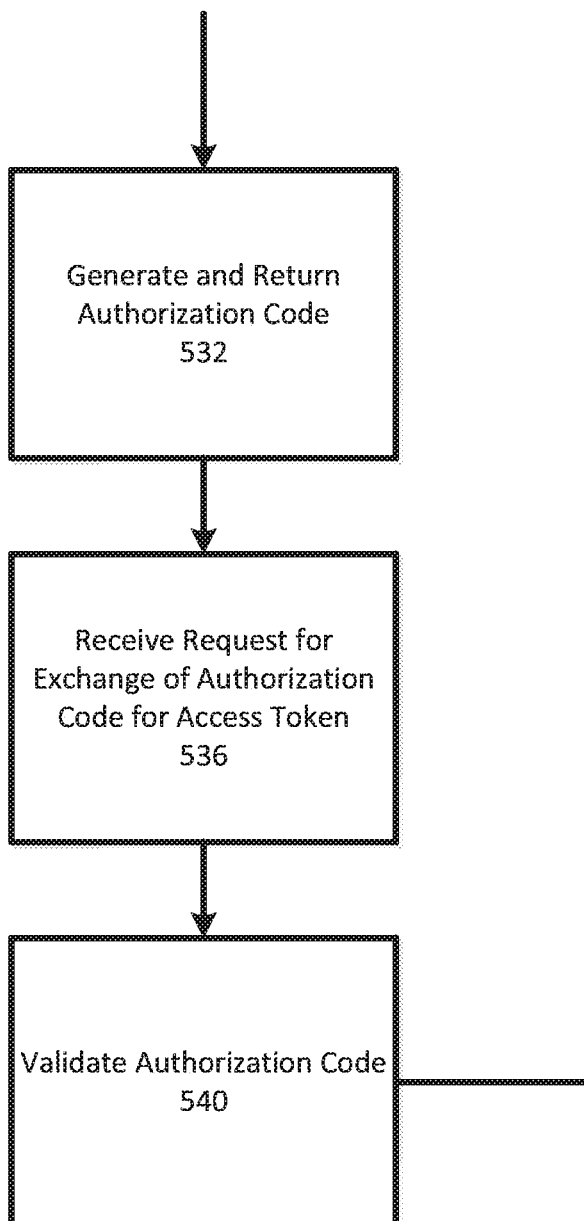
Figure 5B:
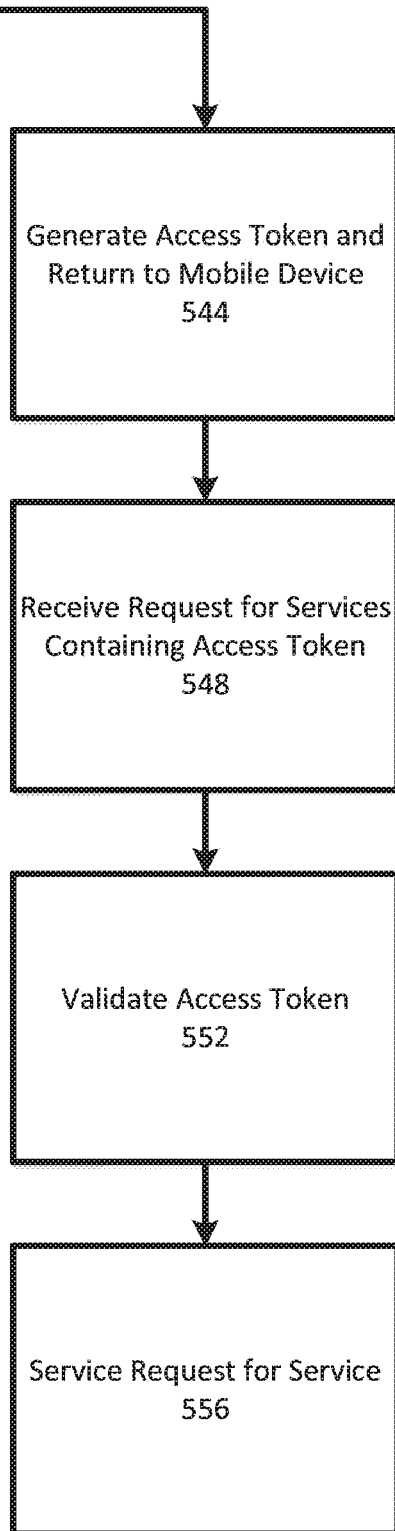

At 500 in FIG. 5A, the user, using mobile device 408, may utilize the native application 436 to request access to the services at third-party service provider system 404. In a preferred embodiment, the user has access to a native application, such as native application 436, which operates on the mobile operating system of the mobile device 408. For example, a user may have installed on his or her mobile device 408 an iOS, Android, Windows Mobile or Blackberry-based native application. If not, the user may at least have the capability to download the native application from an available application store, such as the Apple App Store or the Android Play Store, and install the application for use.

In a preferred embodiment, the native application is associated with the service provider system 404. The native application 436 may be built specifically for use with the third-party service provider system 404 and may designed specifically to receive and process data transmitted from the service provider system 404 in response to service requests. For instance, the native application 436 may be configured to automatically provide users with the ability to nominate other employees for recognition and to process recognition data received from the service provider system 404 to generate recognition graphs and other data for display to the user at the mobile device 408. The native application 436 may also have the capability to make various Application Programming Interface (API) function calls to perform various functions and receive any number of services from the third-party service provider system 404.

Figure 6:
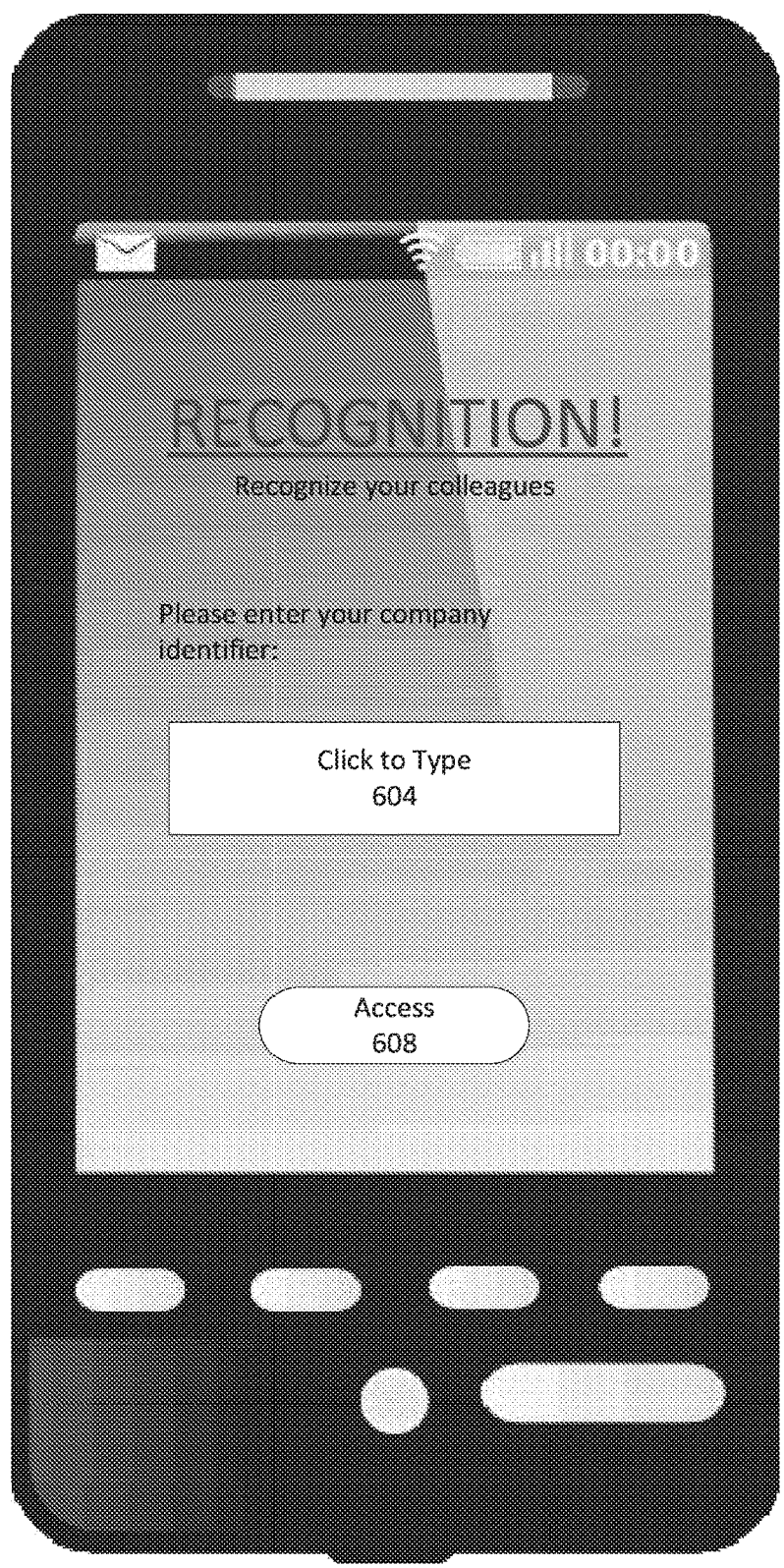
FIG. 6 depicts an SSO log-in user interface in accordance with an embodiment of the present invention.

Upon execution of the native application 436, the user may be provided with the user interface of FIG. 6, which depicts an SSO log-in user interface in accordance with an embodiment of the present invention, comprising a client selection tool 604 and Access button 608. The user may select the client corresponding to the client system 400 using client selection tool 604, which, in the preferred embodiment, is a text entry tool that allows the user to enter the identity of the user's client and/or employer. The identity, for example, may be provided to the user previously, such as through a previous email or letter. In an alternative embodiment, the client selection is 604 may provide a listing of clients that have access to the services of the service provider system 404 from which the user may select from. In this embodiment, it may be a number of companies that use the employee recognition services provided by service provider system 404.

In a preferred embodiment, the user may also (or as a substitute) use the mobile browser 432 on the mobile device 408 to request access to the services of system 404. Rather than a native application 436, the user may load the mobile browser 432 on the mobile device 408 and enter the web address associated with the service provider system 404. The web page that is displayed may be similar to that of the user interface depicted in FIG. 6. While the descriptions of the embodiments of the present invention may refer to a native application, it should be readily understood that such references are merely for exemplary purposes and that a mobile browser may be substituted in operation.

With reference to FIG. 6, after the selection of the client, the user may press the Access Authorization button 608 to begin the service access process. Referring back to FIG. 5A, in response to the user request at 500, the native application 436 may communicate to the service provider system 404 the selected client, as chosen by the user using client selection tool 604. The user's request may be received by the authorization engine 425, which processes the request to determine the address of the users client system 400. In one alternative embodiment, the request is received by a web service of web services engine 430, which is a service that may be publicly accessible and responsive to requests from instances of the native application 436 and mobile browser 432.

At 508, the service provider system 404 (e.g., the authorization engine) replies to the native application 436 with the address of the customer's entered client system 400, and more particularly, with the address of the ID authentication engine 412. The address that is returned may be stored at the mobile device 408. This address may be retrieved and utilized by the native application in future sessions, such that the retrieval of the address at 504 and 508 would not be required.

In one embodiment, the native application 436 may be pre-configured to know the address of the ID authentication engine for each client system and therefore would not need to connect to the web services engine 430 at 504 and 508 to determine the address. In such an embodiment, the native application 436 may connect to the web services engine 430 from time-to-time to receive updates to the client address list.

At 512, using the address returned at 508, the mobile device 408 automatically loads the mobile browser 432 at the mobile device 408, and loads the address within the mobile browser 432. This causes the client's identification authentication web page to be loaded on the mobile browser 432, from which the user may enter his or her SSO credentials. In one embodiment, the native application does not load the mobile browser 432 but automatically connects to the ID authentication engine 412 to automatically display the identification authentication page. Furthermore, in that embodiment, the native application may handle all communications and processes described herein as being performed by the mobile browser 432.

Figure 7:
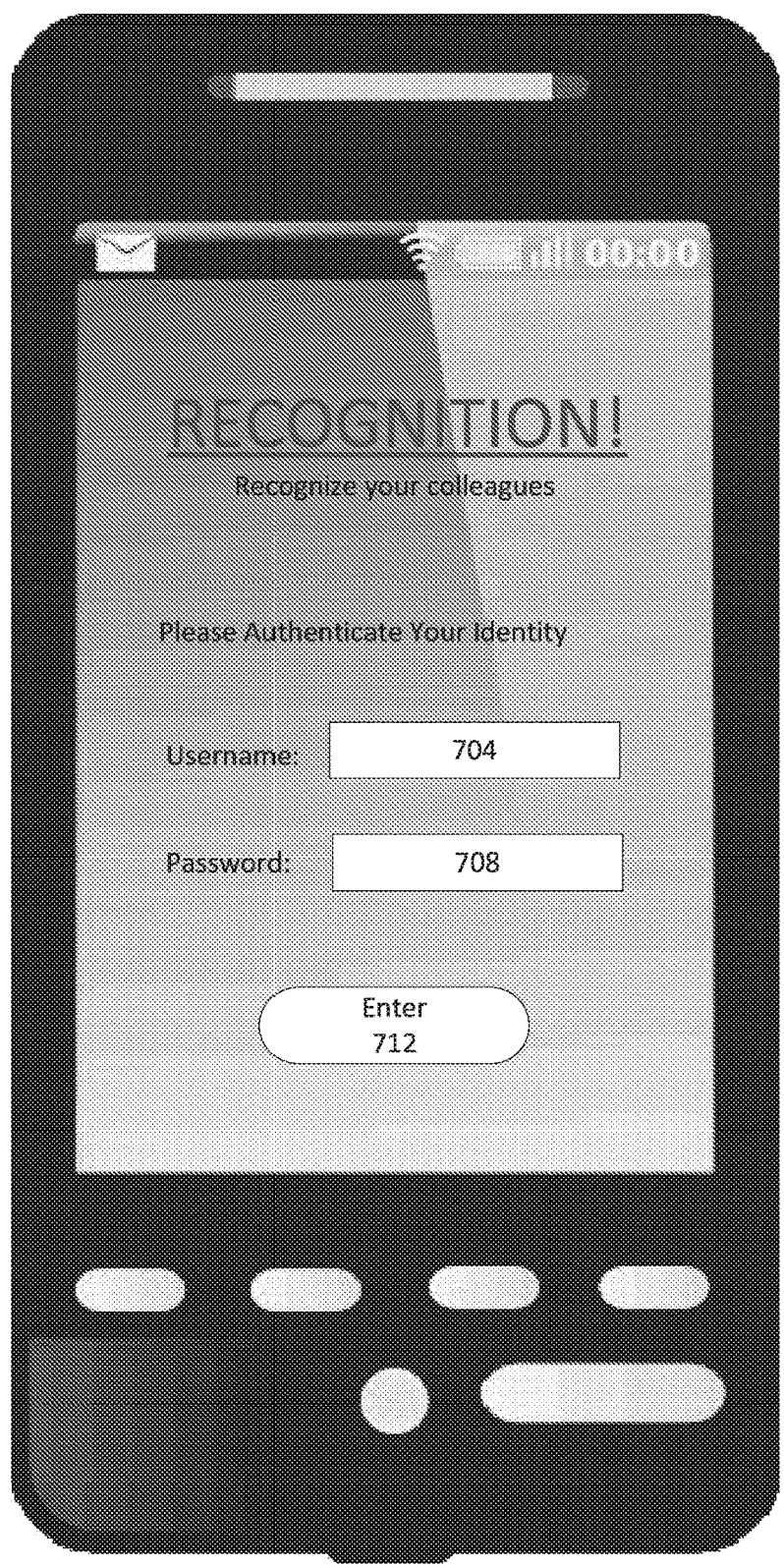
FIG. 7 depicts an identity authentication web page in accordance with an embodiment of the present invention.

FIG. 7 depicts an identification authentication web page in accordance with an embodiment of the present invention comprising a username entry space 704, a password entry space 708, and "Enter" button 712. The user many enter the same SSO credentials he or she normally uses to authenticate his or her identity in accessing the client system 400 and its internal services 418-420 using a terminal, for example. Thus, the user does not have to create new credentials to access third-party services but may authenticate his or her identity using an SSO credential previously established at the client system 400.

At 516 of FIG. 5A, the user's credentials are transmitted to the ID authentication engine 412. At 520, in response to the identification communicated, the ID authentication engine 412 verifies the user's credential with the information stored at the client identification database 416 and transmits an authentication response back to the mobile device 408. In the preferred embodiment, this response contains an authentication token that may be utilized by the mobile device as proof of an authenticated identification.

In the preferred embodiment, the ID authentication engine 412 is a Single Sign On Identity Provider (SSO IdP) that has been configured to use at least the SAML 2.0 encryption protocol. In other preferred embodiments, the ID authentication engine 412 may be configured to support any web-based authentication protocol, including those which utilize various encryption and hashing protocols, such as MD5, HMAC, MD5, TripleDES, SAML 1.1, and SAML 2.0. It should be readily apparent that embodiments of the present invention may also be configured to operate with any other encryption protocols, including those developed in the future. In such instances, the response from the ID authentication system 412 at 520 will structured in accordance with the SSO encryption protocol supported by that client system's identification authentication engine 412. Thus, the authentication token that is returned from the ID authentication engine 412 supporting SAML 2.0 encryption protocol contains a SAML assertion.

In addition to the authentication token, the response at 520 may further contain a redirect function that causes the mobile browser 432 to automatically load an address of the web security engine 424 at the third-party service provider system 404. The address is transmitted as part of the response at 520. In this specific example, the redirect function call that is returned to the mobile device is an HTTP 302 redirect function call to the web security engine 424, though other API, function, or trigger calls may be utilized to achieve similar results.

At 524, the mobile browser 432 automatically loads the address of the web security engine 424 and requests access to the web services available of the third-party service provider system 404. As part of the communication from the mobile browser 532 to the web security engine 424, the authentication token, in this case the SAML assertion, is transmitted to the web security engine 424.

At 528, the web security engine 424 processes the authentication token (i.e., the SAML assertion) and validates the assertion. The web security engine 424, therefore, validates the authentication token transmitted and may perform any form of decryption and other processing known in the art to validate the authentication token. The decryption method at the web security engine 424 is dependent on the SSO protocol utilized by the client system 400. Hence, the SAML assertion received from the client system 400, in this example, is decrypted based on SAML 2.0 methodology, which is based on the XML Encryption methodology (also known as XML-Enc). In a preferred embodiment, the SAML assertion contains a unique client key that is validated against a library of client keys stored by the third-party service provider system 404 to validate the SAML assertion's authenticity.

Furthermore, in preferred embodiments, the web security engine 424 is configured to handle multiple SSO protocols and multiple encryption techniques, including any SSO protocols and/or encryption techniques currently utilized in the industry and those that may be developed in the future.

Turning to FIG. 5B, upon the validation of the SAML assertion by the web security engine 424, the web security engine 424 causes the authorization engine 425 to automatically generate an authorization code that is returned to the mobile device at 532. In one embodiment, the authorization code is in a form required under the OAuth standard (e.g., "hQsCyxVMtSU0ww31rLsLPZnmamqd4_F1KD89Gizt") and is stored at the database 158 and configured to have a short time-out attribute. Furthermore, the response at 532 preferably contains a redirect function that, when processed by mobile device 408, reloads the native application 436 and passes control over to the native application 436 to process the authorization code. In one preferred embodiment, the response at 532 contains a redirect-uri that causes the mobile device 408 to re-load the native application 436 and pass processing control to the native application 436.

At 536, the authorization code is transmitted automatically from the mobile device 408 to the token engine 426 at the third-party service provider system 404 as part of a request to exchange the authorization code for an access token. At 540, the authorization code is validated by the authorization engine 425. Where the authorization code that is provided is invalid or the authorization code has expired (by comparing with the time-out attribute at database 428), the user may receive a message on the display of the mobile device 408. The user may be asked to try again or, in one embodiment, the additional attempts may be performed automatically. Where the validation of the authorization code is successful, the token engine 426 generates an access token for the user and communicates the access token the native application 436, at 544. The details of the access token, in one embodiment, are stored at database 428 for future references and validation.

With an access token, the native application 436 can now make service requests to the web services engine 430 of the third-party service provider system 404 for services to which the access token gives them authorized access by passing along the access token with each service request. Thus, at 548 in FIG. 5B, the user may request access to nominate a team member for a recognition moment by submitting a request to the web services engine 430. The request contains the access token, thereby providing the web services engine 430 with the identity information of the user requesting the service. Upon receiving each request, the web services engine 430, at 552, communicates the token to the token engine 426 to validate the token against the records stored at database 428. In one embodiment, the token engine 426 ensures that the user has the rights to nominate a team member for a recognition moment.

In the preferred embodiment, the access token is in a form in accordance with a mobile SSO protocol, such as the OAuth2 protocol. However, the use of other forms of tokens and/or authorization protocols is also well within the scope of the present invention. The authorization protocol, in the preferred embodiment, would correspond to the authorization protocol utilized by the web services engine 430.

At 556, upon the successful validation of the access token, the web services engine 430 services the requested service and the results of the service request are returned to the native application 436 for processing and display to the user. The user may continue to make additional service requests in similar fashion during the pendency of the access token. After the expiration of the access token, the user must re-authenticate and reauthorize before his or her service requests can be processed by the third-party service provider system 404. In one embodiment, the lifecycle and management policies associated with the access token, such as the expiration length of the access token are in accordance with the OAuth 2 standard. In a preferred embodiment, the access token may have a time-out attribute of 15 minutes. Thus, after 15 minutes of inactivity, the access token would expire and the mobile device 408 would have to request another access token. Where an attempt is made to use to expired token, the token engine 426 may return an error or an exception to the mobile device 408 and an error message may appear on the display of the mobile device 408. In such scenarios, the user may request another access token, at which point, the mobile device 408 may perform many of the same steps to retrieve an access token as described above.

In one preferred embodiment, in addition to access tokens, the token engine 426 generates a refresh token, which is also returned to the native application 436. Refresh tokens, like access tokens, may be used to provide identity information in service requests. An access token may be set to be short lived (e.g., 15 minutes). Once an access token has expired, the user can request a new one using a refresh token. Refresh tokens may also have a timeout setting but may be much longer than access tokens (e.g., hours or days). Thus, refresh tokens may be utilized as a means for the mobile device 408 to request a second access token without requiring the user to re-authenticate his or her identity with the client system 400.

In an embodiment, the user can request to refresh their access token as many times as they like until their refresh token has expired. Furthermore, in various embodiments, the expiration time for the access token and/or the refresh token may be configured to be consistent system wide or may be customized according to specific client systems or according to specific users, if desired.

Thus, embodiments of the present invention seamlessly integrate client-side SSO authentication infrastructure with a mobile authorization protocol supported by the server-side web services, thereby providing mobile users with seamless authenticated and authorized access to the third-party web services. The generation and use of authorization codes and their exchange for access tokens allows any number of client-side authentication SSO protocols to be supported by the third-party service provider system, thereby providing the flexibility for the service provider system to service multiple different client systems, even where the client systems are configured to support entirely different client-side SSO protocols. Similarly, the system's exchange of the authorization code for an access token may allow for any type of mobile authorization protocol to be supported. Authorization protocols may also be updated or changed in the future with little to no effect on the client-side configuration for SSO authentication.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or may include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

On or more monitors or display devices may also be connected to the system bus via an interface. In addition to display devices, computers may also include other peripheral output devices, winch may be connected through an output peripheral interface. The computers implementing the invention may operate in a networked environment using logical connections to one or more remote computers, the remote computers typically including many or all of the elements described above.

Various networks, such as networks 312 and 410, may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, air Intranet, Extranet, Ethernet, or any other system that provides communications. Some suitable communication protocols may include TCP/IP, UDP, or OSI, for example. For wireless communications, communications protocols may include. Bluetooth, Zigbee, IrDA or other suitable protocol. Furthermore, components of the system may communicate through a combination of wired or wireless paths.

As used herein, references to "terminals(s)," "computers(s)" and/or "device(s)," such as the mobile devices, may include, without limitation, a general purpose computer that includes a processing unit, a system memory, and a system bus that couples various system components including the system memory and the processing unit. The general purpose computer may employ the processing unit to execute computer-executable program modules stored on one or more computer readable media forming the system memory. The program modules may include instructions, routines, programs, objects, components, data structures, etc., that perform particular tasks or implement particular abstract data types. The "computer(s)," "machine(s)" and/or "device(s)," may assume different configurations and still be consistent with the invention, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices. Similarly, references to "mobile device(s)," may include any computer or device that is mobile in nature, including, for example, a mobile phone, a smartphone, a tablet or any other devices that may be configured to operate with a mobile operating system, including, but not limited to, the Apple iOS operating system, Android operating system, Windows Mobile operating system, and Blackberry operating system.

Moreover, as used herein, references to "engine," "service provider," and "services" (e.g., Web security engine 424, authorization engine 425, token engine 426, ID authentication engine 412, etc.) generally mean, but are not limited to, a software or hardware component that performs certain tasks. The processing unit that executes commands and instructions may be a general purpose computer, but may utilize any of a wide variety of other technologies. Thus, an engine may include, by way of example, components, such as software components, object-oriented software components, class libraries, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or be further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

Although many other internal components of the computer are not shown, those of ordinary skill in the art will appreciate that such components and the interconnections are well known. Accordingly, additional details concerning the internal construction of the computer need not be disclosed in connection with the present invention. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents. While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

Figure 8:
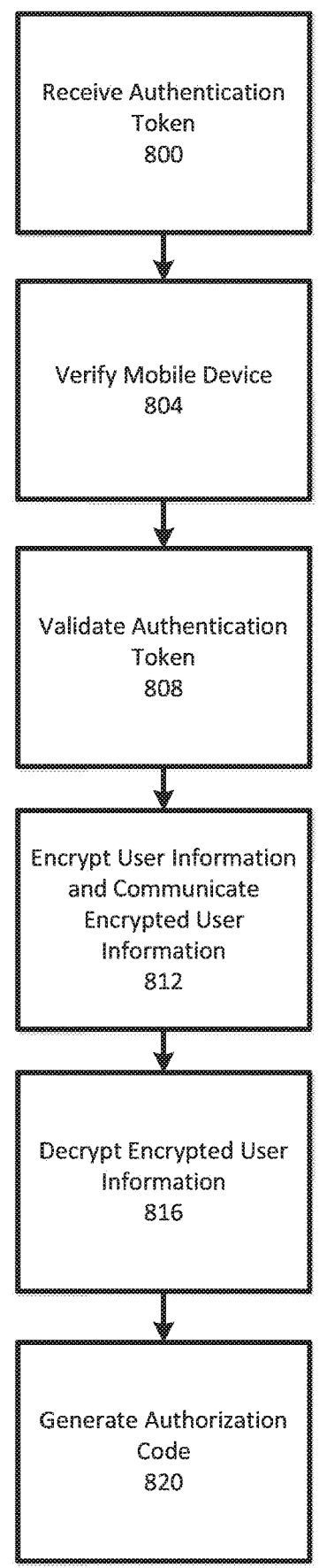
FIG. 8 depicts a flowchart illustrating the validation of an authentication token at the third-party service provider system in accordance with an embodiment of the present invention.

In addition to the preferred embodiments described above, various other embodiments of the present invention also provide mobile SSO access to third-party services. FIG. 8 depicts a flowchart illustrating the validation of an authentication token at the third-party service provider system in accordance with an embodiment of the present invention. The flowchart of FIG. 8 outlines operations that may be taken at the third-part service provider system's web security engine, authorization engine, and token engine in processing an authentication token, generating the authorization code in response, and processing the authorization code to provide the user with an authorization token.

At 800, the web security engine receives the authentication token from a mobile device. As explained with reference to other figures within this specification, the web security engine of the third-party service provider system may receive an authentication token from the mobile device after the mobile device has authenticated with the client system's ID authentication engine. For example, in one embodiment, the client system's SSO IdP server authenticates the identity of the user by validating the username and password entered by the user and redirects the mobile device to the third-party service provider system for authorization and servicing of the third-party service request. The response to the mobile device contains the authentication token and the redirect function call. In an embodiment in which the Idp server of the client system supports SAML 2.0 SSO authentication, for example, the response received at the web security engine contains an authentication token in the form of a SAML assertion.

At 804, the web security engine verifies that the service request originates from a mobile device. Where the request does not originate from the mobile device, the web security engine may operate to authorize the service request in fashions well known in the art in processing a web-based service request not originating from a mobile device. In one embodiment, the web security engine checks the metadata information contained in the service request received from the mobile device to validate the type of system that originated the service request. When the authorization request is not from a mobile device, the authentication token is validated and if the user is authorized to access the web application then control may be passed to a web application, engine or service at the third-party service provider system, along with the user's authorization.

At 808, after the originating device is determined to be a mobile device, the web security engine proceeds to validate the user by processing the SAML assertion attached as part of the request. Techniques to process the SAML assertion known in the art may be used to process the SAML assertion, which contains the identity of the user.

At 812, the user's information that is provided as part of the SAML assertion is encrypted. In addition, any other user information that is managed and/or accessible by the web security engine may also be encrypted. In one embodiment, the user's SSO identity and details of his or her service request are encrypted. Any encryption techniques may be utilized to encrypt the user information at 812. The web security engine then communicates the encrypted user information to the mobile device, along with a redirect function call that causes the mobile device to automatically submit an authorization request to the authorization engine at the third-party service provider system. In one embodiment, the web security engine returns to the mobile device an HTML autopost form that causes the mobile device to automatically submit an authorization request to the authorization engine that contains the encrypted user information. In at least one embodiment, the encrypted user information is automatically communicated from the web security engine to the authorization engine at the third-party service provider system, without the mobile device's involvement.

At 816, the authorization engine decrypts the encrypted user information. Using the encrypted user information, the authorization engine automatically generates an authorization code at 820. As described in reference to other figures in this specification, the authorization code may be utilized to request an access token.

Figure 9:
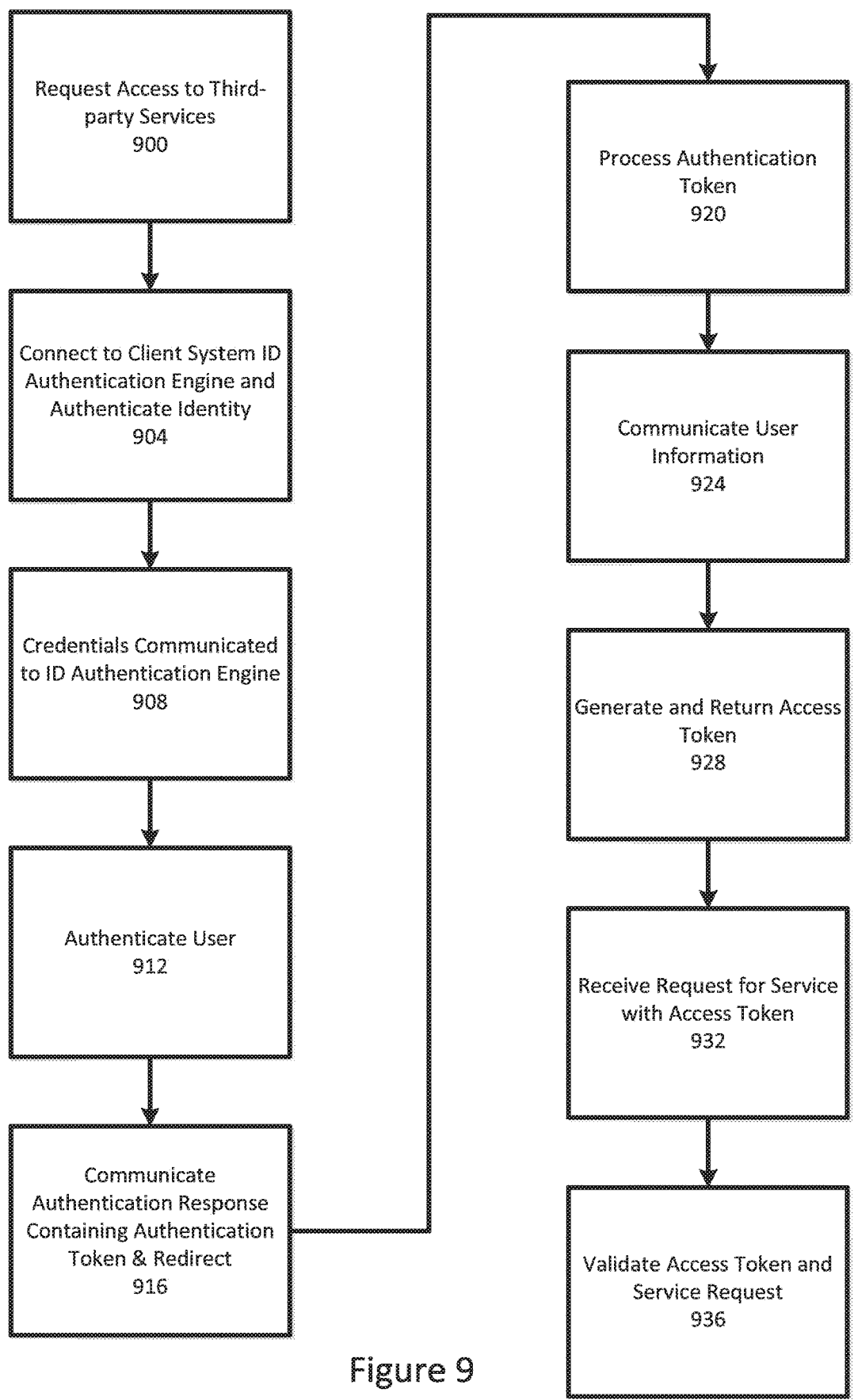
FIG. 9 depicts a flowchart illustrating a method of processing a user service request in accordance with an embodiment of the present invention.

FIG. 9 depicts another method of processing a user service request in accordance with an embodiment of the present invention. At 900, a user, using a mobile device may utilize a native application on the mobile device to request access to the services at a third-party service provider system. Upon execution of the native application, the user may be asked to select the client corresponding to their company from a listing of companies supported by the third-party service provider. At 904, using information stored within the native application, the native application may automatically load the mobile browser and connect to the client system's ID authentication engine. The user may be asked to authenticate his or her identity. In one embodiment, other forms of SSO identity authentication may be used, including security measures involving voice, facial, retina and fingerprint recognition. Where the user has previously used the native application in the past, the native application may automatically store previously entered username and client selections and reload these selections upon activation of the native application automatically.

At 908, the user's credentials are transmitted to the ID authentication engine. At 912, in response to the identification communicated, the ID authentication engine verifies the user's credentials with the information stored at the database and transmits an authentication response back to the mobile device containing an authentication token and a redirect function that causes the web browser to redirect to the web security engine of the third-party provider system. The authentication token is then communicated to the web security engine at 916 as part of a request to access the web services of the third-party service provider system.

At 920, the web security engine processes and validates the authentication token. The web security engine may also verify that the service request originates from a mobile device. At 924, in response to the validation of the authentication token, the web service engine may communicate a message to the token engine indicating that a user's identity has been verified. The message, in one embodiment, may include the user's identity information, the client system identifier, and mobile device information. At 928, the token engine may automatically cause the generation of an access token in response. At 932, this access token is returned to the mobile device. With an access token, the native application can make service requests to the web services engine of the third-party service provider system 404 by passing along the access token with each service request, thereby providing the web services engine 428 with the identity information of the user requesting the service.

Upon receiving each service request, the web services engine, at 932, communicates the token to the token engine to validate the token. At 936, upon the successful validation of the access token, the web services engine services the requested service and the results of the service request are returned to the native application for processing and display to the user.

Thus, in the embodiment of the present invention described in FIG. 9, the access token is automatically generated in response to the validation of the user's authentication token.

In at least one other embodiment of the present invention, in response to the validation of the authentication token, an authorization code is still generated by the authorization engine. However, rather than returning the authorization code to the mobile device and causing the mobile device to forward the code to the token engine, in this embodiment of the present invention, the authorization code is communicated from the authorization engine to the token engine to request an exchange for an access token.

As described in various embodiments, the access token may be utilized to request service request of the third-party service provider without requiring the user to manually enter (or, re-enter) his or her credentials to authenticate his or her identity. With each service request, the access token will be attached. For instance, the user can request services from a third-party service provider system that provides the Employee Recognition System, as incorporated herein. As one example, the user can request to view all of the employee recognition nominations that are pending for the user. Using the native application, a request can be made with the following form:

https:// . . . aprovalservice/approvals

The request communicated will contain several parameters including those listed in FIG. 10A. In this case, the request contains the access token and also parameters describing the number of pages to retrieve and the number of requests. In response to this request, the web service that is responsive to the above address at the third-party service provider will process the access token. The web service will automatically process the access token to identity the user (e.g., the user ID), and return the results for that user ID for display. In one embodiment, the web service returns the results as part of a JSON response describing the nominations that are pending approval for the authenticated user. Other structures of the response can also be utilized in returning requests results.

As another example, a user can approve or disapprove a nomination for recognition, as identified by a groupid parameter of a nomination request, by causing the native application make the following request:

http:// . . . approvalservice/approve

The request will contain the access token, along with various parameters, including those listed in FIG. 10B. The web service will return with a text description of the pending approval item and whether or not the action succeeded or failed. Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made expressly herein, without departing from the spirit and scope of the invention. In fact, variations, modifications, and other implementations of what was described herein will occur to those of ordinary skill in the art without departing from the spirit and the scope of the invention. In particular, it should be understood that the order of steps or order for performing certain actions is immaterial so long as the invention remains operable. Two or more steps or actions may also be conducted simultaneously. As such, the invention is not to be defined only by the preceding illustrative description.

From the foregoing, it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations. This is contemplated and within the scope of the invention.

The invention claimed is:

1. A client-side computer system for managing single sign-on (SSO) credentials between mobile devices and a service provider computer system providing web services to the mobile devices, the client-side computer system comprising:
non-transitory computer memory storing executable computer instructions;
a programmable processor, the programmable processor executing at least a portion of the stored executable computer instructions to perform at least the following:
receiving, from the service provider system or from a mobile device, a request to authenticate an identity of a user;
generating an authentication token upon authenticating the identity of the user;
communicating the authentication token to the service provider system directly or through the mobile device, wherein the authentication token causes the service provider system to perform at least the following:
selecting an authentication protocol from a plurality of supported authentication protocols based on at least one of a client identifier communicated from the mobile device, the authentication token, and an attribute of the mobile device,
validating the authentication token in accordance with the selected authentication protocol, and
generating an authorization access code or an authorization access token upon validating the authentication token, wherein a service request received from the mobile device and containing the authorization access code or the authorization access token will cause the service provider system to service the service request.

2. The client-side computer system of claim 1, wherein the authentication token is generated based on an SSO protocol supported by the client-side computer system.

3. The client-side computer system of claim 1, wherein the mobile device is redirected to a web-identification authentication service at the client-side computer system to authenticate the identity of the user after the mobile device submits, to the service provider system, a request to access web services.

4. The client-side computer system of claim 3, wherein the mobile device is redirected in response to receiving the identification of a specified client associated with the user.

5. The client-side computer system of claim 4, wherein the web-identification authentication service or the client-side computer system is selected based on the specified client.

6. The client-side computer system of claim 3, wherein the request is received from an application executing on the mobile device.

7. The client-side computer system of claim 6, wherein the application is not a web browser application.

8. The client-side computer system of claim 1, further configured to communicate to the mobile device a message containing the authentication token and a redirect function call that, when processed by a processor at the mobile device, causes the mobile device to automatically communicate the authentication token to the service provider system.

9. The client-side computer system of claim 1, wherein the authorization access code, when processed by a processor at the mobile device, causes the mobile device to communicate the authorization access code to the service provider system to request the authorization access token.

10. The client-side computer system of claim 1, wherein the authorization access token is generated in accordance with a mobile SSO protocol.

11. The client-side computer system of claim 1, wherein the plurality of supported authentication protocols includes at least one of the following:
SAML 1.1;
SAML 2.0; and
a custom authentication protocol supported by the client-side computer system.

12. A method for a client-side computer system to manage single sign-on (SSO) credentials between mobile devices and a service provider computer system providing web services to the mobile devices, the method comprising:
receiving, from the service provider system or from a mobile device, a request to authenticate an identity of a user;
generating an authentication token upon authenticating the identity of the user;
communicating the authentication token to the service provider system directly or through the mobile device, wherein the authentication token causes the service provider system to perform at least the following:
selecting an authentication protocol from a plurality of supported authentication protocols based on at least one of a client identifier communicated from the mobile device, the authentication token, and an attribute of the mobile device, validating the authentication token in accordance with the selected authentication protocol, and generating an authorization access code or an authorization access token upon validating the authentication token, wherein a service request received from the mobile device and containing the authorization access code or the authorization access token will cause the service provider system to service the service request.

13. The method of claim 12, wherein the authentication token is generated based on an SSO protocol supported by the client system.

14. The method of claim 12, wherein the mobile device is redirected to a web-identification authentication service at the client-side computer system to authenticate the identity of the user after the mobile device submits, to the service provider system, a request to access web services.

15. The method of claim 14, wherein the mobile device is redirected in response to receiving the identification of a specified client associated with the user.

16. The method of claim 15, wherein the web-identification authentication service or the client-side computer system is selected based on the specified client.

17. The method of claim 14, wherein the request is received from an application executing on the mobile device.

18. The method of claim 17, wherein the application is not a web browser application.

19. The method of claim 12, further comprising:

communicating to the mobile device a message containing the authentication token and a redirect function call that, when processed by a processor at the mobile device, causes the mobile device to automatically communicate the authentication token to the service provider system.

20. The method of claim 12, wherein the authorization access code, when processed by a processor at the mobile device, causes the mobile device to communicate the authorization access code to the service provider system to request the authorization access token.

21. The method of claim 12, wherein the authorization access token is generated in accordance with a mobile SSO protocol.

22. The method of claim 12, wherein the plurality of supported authentication protocols includes at least one of the following:

SAML 1.1;

SAML 2.0; and a custom authentication protocol supported by the client-side computer system.

23. A non-transitory computer readable medium having computer readable code for causing a client-side computer system to manage single sign-on (SSO) credentials between mobile devices and a service provider computer system providing web services to the mobile devices, the computer readable code causing the client-side computer system to perform:

receiving, from the service provider system or from a mobile device, a request to authenticate an identity of a user;

generating an authentication token upon authenticating the identity of the user;

communicating the authentication token to the service provider system directly or through the mobile device, wherein the authentication token causes the service provider system to perform at least the following:

selecting an authentication protocol from a plurality of supported authentication protocols based on at least one of a client identifier communicated from the mobile device, the authentication token, and an attribute of the mobile device, validating the authentication token in accordance with the selected authentication protocol, and generating an authorization access code or an authorization access token upon validating the authentication token, wherein a service request received from the mobile device and containing the authorization access code or the authorization access token will cause the service provider system to service the service request.

* * * * *